United States Patent [19]

Chen et al.

[11] Patent Number: 5,104,672
[45] Date of Patent: Apr. 14, 1992

[54] PRODUCTION OF FLAVOR

[75] Inventors: Teh-Kuei Chen, Gaylordsville; John S. Tandy, Litchfield, both of Conn.

[73] Assignee: Nestec S.A., Vevey, Switzerland

[21] Appl. No.: 696,285

[22] Filed: Apr. 26, 1991

Related U.S. Application Data

[63] Continuation of Ser. No. 63,310, Jun. 17, 1987, abandoned.

[51] Int. Cl.$^5$ .............................................. A23L 1/22
[52] U.S. Cl. ..................................... 426/312; 426/533
[58] Field of Search .................................. 426/533, 312

[56] References Cited

U.S. PATENT DOCUMENTS

| | | | |
|---|---|---|---|
| 3,102,817 | 9/1963 | Green | 426/533 |
| 3,532,514 | 10/1970 | May | 426/533 |
| 3,619,211 | 11/1971 | Chang et al. | 426/533 |
| 3,642,497 | 2/1972 | Gunther | 426/533 |
| 4,571,342 | 2/1986 | DiCicca et al. | 426/533 |
| 4,604,290 | 8/1986 | Lee et al. | 426/533 |

FOREIGN PATENT DOCUMENTS 60-070047 4/1985 Japan .

OTHER PUBLICATIONS

Swern, Bailey's Industrial Oil and Fat Products, 4th Ed., 1979, John Wiley & Sons: New York, p. 342.

*Primary Examiner*—Joseph Golian
*Attorney, Agent, or Firm*—Vogt & O'Donnell

[57] ABSTRACT

Flavoring compositions are prepared by heating at least one fatty acid at a temperature of from 150° C. to 475° C. in the presence of oxygen.

16 Claims, 1 Drawing Sheet

PRODUCTION OF FLAVOR

CROSS-REFERENCE TO RELATED APPLICATION

This is a continuation application of application Ser. No. 07/063,310, filed June 17, 1987, now abandoned.

BACKGROUND OF THE INVENTION

The present invention relates to a process for the preparation of a flavouring composition.

In U.S. Pat. No. 4,571,342 there is described a process for the preparation of a flavouring composition with a charcoal broiled flavour which is prepared by subjecting a film of fat or oil to a temperature within the range of from 285° C. to 475° C. in the presence of oxygen for a period of time effective to develop a charcoal broiled flavour and collecting the resultant fat or oil.

We have now found, surprisingly, that individual fatty acids or mixtures thereof, when subjected in the presence of oxygen to temperatures similar to those used in the process described in U.S. Pat. No. 4,571,342 produce flavouring compositions with characteristics specific to each individual fatty acid or mixture, these flavouring compositions being obtained not only from the treated fatty acid starting material but also from the volatile distillates formed during the treatment.

Accordingly, the present invention provides a process for the preparation of a flavouring composition which comprises subjecting a fatty acid or any mixture of two or more fatty acids to a temperature from 150° C. to 475° C. in the presence of oxygen and collecting the resultant treated fatty acid or the volatiles distilled therefrom.

The fatty acids employed may be saturated or unsaturated, may contain from 6 to 30 carbon atoms, preferably from 10 to 27 and especially from 16 to 24 carbon atoms. They may, for instance, be obtained from any edible triglyceride fat or oil by enzymatic, chemical or high temperature/pressure hydrolyses. Examples of suitable oils from which fatty acids may be obtained include safflower, linseed, blackcurrant seed and grapeseed oils which are naturally rich in linoleic acid (64–78%), and olive oil, low erucic acid rapeseed oil and high oleic safflower oils which are naturally rich in oleic acid.

Fatty acids suitable for employment in the present invention include, for example, lauric acid, palmitic acid, stearic acid, oleic acid, linoleic acid which may be used individually or as mixtures. Particular fatty acid mixtures which are also suitable include butter acids, dairy acids, cheese acids, enzyme hydrolysed vegetable oils such as olive oil or coconut oil and enzyme hydrolysed animal fats. It is also possible to use a fatty acid which has been oxidised (.i.e., rancidified), e.g. 10-hydroperoxylinoleic acid.

In addition, the fatty acids can advantageously be used in admixture with certain triglycerides e.g. a mixture of beef fat and oleic acid, for instance, in a ratio of from 2:1 to 4:1 and a mixture of chicken fat and linoleic acid, for instance, in a ratio of from 2:1 to 6:1.

Moreover, if desired, flavour precursors may be added to the fatty acid prior to the heat treatment to enhance the flavour, e.g., sulphur containing compounds such as cysteine, cystine, methionine, thiamine, hydrogen sulphide, or sulphur containing extract from vegetables such as onions, garlic or members of the "Brassica" family.

Preferably, the temperature to which the fatty acids or mixtures thereof are subjected is from 250° C. to 400° C. and especially from 285° C. to 350° C. The time of the treatment may be from a few seconds to several hours, more usually from 1 minute to 6 hours, and preferably from about 5 minutes to 4 hours. The actual period of time chosen may be the time effective to produce the desired flavour note, longer periods generally producing more smoked or charcoal cooked notes.

The flavourants created by the process of the present invention depend on the fatty acid material employed. For example, oleic acid or a mixture of fatty acids containing predominantly oleic acid have a strong beef-like character while linoleic acid or a mixture of fatty acids containing predominantly linoleic acid have a strong roasted chicken or fish character.

Several types of apparatus may be used for the preparation of the flavourant. For example, a thin film reactor similar to that used in U.S. Pat. No. 4,571,342 may be employed and such apparatus would also include pipe reactors, etc., where a thin film of the fatty acid material is passed down the sides of a heated pipe while air or oxygen is passed through the pipe. When such an apparatus is used, the fatty acid material that passes through the pipe is collected and used as the flavourant. However, in the present invention the use of a bomb-type apparatus is especially advantageous because by using such an apparatus not only can the treated fatty acid material be used as a flavourant but also the volatiles distilled or carried by the air flow out of the reactor can be collected and used as a flavourant. In addition, distillates offer the advantage of fractionating the volatiles with time to produce a broader range of flavourants, each having a different flavour, which can be used either individually or in combination with other fractions to obtain an even broader range of flavourants. Moreover, there is usually a significant amount of water distilled over with the volatiles generated in a bomb-type apparatus and if this water is separated from the volatiles, it can also be used as a flavourant. Thus, by varying the initial fatty acid material employed, the reaction temperature, the intervals of time used for collecting the volatiles and the specific combinations of the fractions, a myriad number of flavour notes can be generated from a single fatty acid. In addition, two or more fractions obtained from different processes according to this invention may be used as flavourants.

By the process of the present invention, flavours can be obtained which can be specifically targeted towards a wide variety of meats, chicken, fish or cheese depending on the starting fatty acid material employed, the temperature used and, if a bomb-type apparatus is used, the specific times that the volatile fractions are taken, as well as the combinations of the fractions.

The oxygen present in the treatment is conveniently obtained from air, and the quantity required depends on the method employed to produce the flavourant. Generally the air is passed through the fatty acid material at a rate of from 1 to 5000 ml/min per 100 g fatty acid material. However, within this range, when a pipe reactor is used, a small amount of air is generally satisfactory, e.g., between 0 and 100 ml/min per 100 g fatty acid material, especially when the flavourant is the recovered treated fatty acid material. When a bomb-type apparatus is used, the air is preferably passed through at a rate of from 10 to 3000 ml/min and especially from 15 to 2500 ml/min per 100 g fatty acid material.

The flavouring composition produced by the process of the present invention may be used in the powdered form which may be obtained by spray drying in admixture with carriers which can encapsulate the flavouring composition, e.g., gum arabic, malto-dextrin modified, food starches, dextrins or a protein such as gelatin. Advantageously, a solution or an emulsion of the flavouring composition and carrier is formed which is dried, for example, by spray-drying. The amount of flavouring composition present is usually from 5% to 50% and preferably from 15% to 30% by weight based on the total weight of the flavouring composition and the carrier.

The flavouring composition can be used by itself, dispersed in a fat, or in admixture with a carrier, for incorporation into, or coating onto a wide variety of foodstuffs to impart the specific flavour e.g. meats, sauces, soups, etc.

The present invention will now be further illustrated by way of example with reference to the accompanying drawing.

DESCRIPTION OF THE PREFERRED EMBODIMENT

Figure 1:
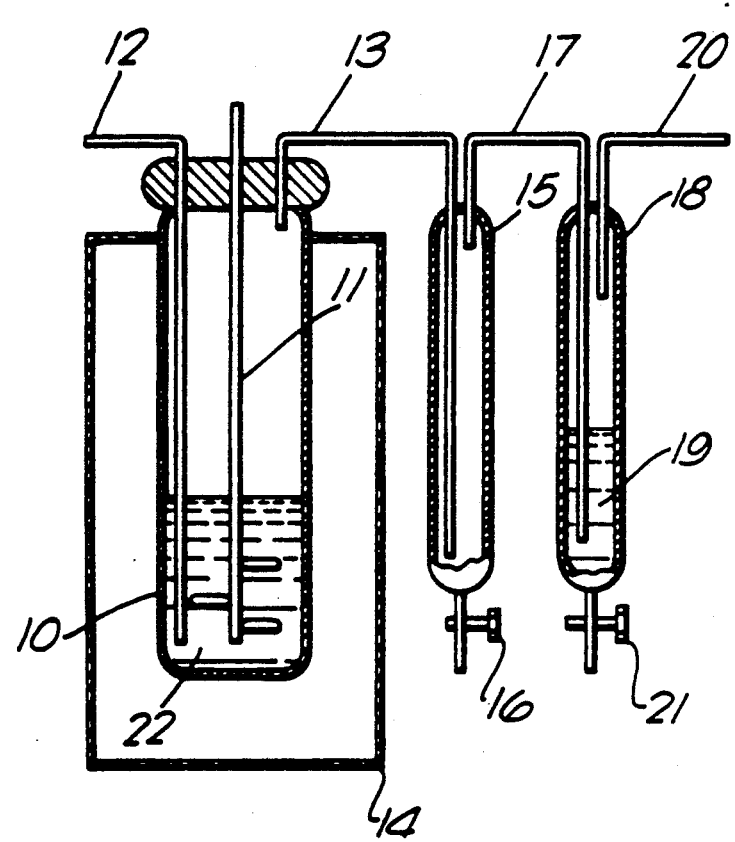
FIG. 1 represents a bomb apparatus which may be employed as the reactor.

Referring to FIG. 1, the apparatus comprises a 600 ml bomb 10, fitted with a stirrer 11, an air inlet 12 and an air outlet 13, surrounded by a bomb jacket 14 provided with a heating element (not shown). The air outlet 13 passes into the top of a cold trap 15 fitted with a tap 16 and an air outlet 17 which in turn passes into the top of a cold water trap 18 containing 400 ml water 19 and fitted with an air outlet 20 to the atmosphere and a tap 21. Both traps 15 and 18 are maintained at a temperature of 4° C. by being immersed in ice-baths (not shown).

In operation, 100 g of fatty acid material 22 is introduced into the bomb and air is passed at 2000 ml/min through the air inlet 12 and bubbled through the fatty acid material which is agitated by the stirrer 11 and heated to the appropriate temperature. The air outlet 13 allows the passage of the air and the volatiles distilled from the fatty acid material by gas "stripping", into the cold trap 15. Any volatiles which pass cold trap 15 can be further collected in the cold trap 18 by passing through the air outlet 17.

The volatiles collected in the cold trap 15 are further fractionated by time whereby all the volatile material distilled from the bomb 10 into the cold trap 15 between 0 and 5 minutes is run off from the tap 16 and collected as one flavourant, the volatiles distilled into the trap between 5 and 10 minutes are collected as a second flavourant, those between 10 and 15 minutes are collected as a third flavourant, etc., and further fractions collected until no further volatiles are generated from the bomb. Each fraction collected has a different flavour. A significant amount of water distils over with the fat-soluble volatiles generated in the bomb and this water is separated to give a further flavourant. The volatile material which is collected in the water trap 18 is run off from tap 21 and collected to give yet another flavour.

EXAMPLES

The following Examples further illustrate the present invention.

EXAMPLE 1

100 g oleic acid was placed in a bomb and heated to 300° C. Air was passed in at 100 ml/min and bubbled through the material and trapped in a cold water trap. After 30 minutes at 300° C. the material was cooled and removed from the bomb. The treated oleic acid material was then evaluated as follows:

Three samples were prepared in which the following ingredients were weighed into separate containers as follows:

a) 2.14 grams of a hydrolysed plant protein;
b) 2.10 grams of the hydrolysed plant protein used in (a) and 0.04 grams of oleic acid which had not been subjected to the high temperature treatment of the present invention; and
c) 2.10 grams of the hydrolysed plant protein used in (a) and 0.04 grams of the oleic acid treated as in Example 1.

All three samples were hydrated separately with 180 ml of boiling water. A tasting panel found that only sample (c) had an excellent roast beef dripping character while sample (b) had a slightly more fatty character than sample (a) but did not have the beef or the roast character.

EXAMPLE 2

By following a similar procedure to that described in Example 1 but using linoleic acid instead of the oleic acid there used, a flavouring composition with a roasted chicken skin character was produced.

EXAMPLE 3

200 grams of water used as a cold water trap as described in Example 1 were heated to 90° C. and 83.2 grams of malto-dextrin and 83.2 grams of gum arabic were added to it while mixing in a high shear mixer. Then 33.2 grams of the oleic acid flavouring material obtained by the process described in Example 1 were added and the mixture was homogenised and spray dried.

A tasting panel found that the dried powder (either alone or in a blend consisting of 2.1 grams of hydrolysed plant protein and 0.25 grams of the dried powder) had the same excellent roast beef character as the starting material.

EXAMPLE 4

Using the apparatus illustrated in FIG. 1, 150 g of oleic acid were placed in the bomb and the bomb sealed. The oleic acid was heated to 325° C. with stirring and air passed through at 3000 ml/min. Five minutes after the temperature had reached 325° C. the material collected in the cold trap was removed, the water layer separated from the fatty layer, and the fatty layer labelled Fraction 1. When 10 minutes had elapsed the material was again removed from the cold trap, the water separated, and the fatty layer labelled Fraction 2. The fractions five were collected every 5 minutes until no further material was collected from the bomb. The water layers from each fraction were pooled into one fraction and labelled Water Phase.

0.02 grams of each flavourant were mixed with 2.0 grams of hydrolysed plant protein and hydrated with 180 ml of boiling water. 0.02 grams of the water phase were mixed with the same amount of HPP and boiling water. 0.02 grams from the water trap were mixed in the same fashion. The results of a tasting panel were as follows:

| ORGANOLEPTIC EVALUATION: | DESCRIPTION |
|---|---|
| Water trap | grilled beef |
| Water Phase | bloody beef |
| Fraction 1 | braised beef |
| Fraction 2 | roast beef |
| Fraction 3 | steak-like beef |
| Fraction 4 | roasted beef |
| Fraction 5 | roast beef (well done) |

Further, these fractions were combined in various ratios to provide specific flavour character of a variety of applications, such as a beef "au jus" dehydrated mix.

EXAMPLE 5

Using the apparatus illustrated in FIG. 1, 100 g of oleic acid were placed in the bomb and the bomb sealed. The oleic acid was heated to 325° C. with stirring and air passed through at 1830 ml/min. Two minutes after the temperature had reached 325° C., the material collected in the cold trap was removed, the water layer separated from the fatty layer, and the fatty layer labelled fraction 1. When 4 minutes had elapsed, the material was again removed from the cold trap, the water separated, and the fatty layer labelled fraction 2. The fractions were collected until no further material was collected from the bomb. The water layers from each fraction were pooled into one fraction and labelled water phase. 0.02 grams of each flavourant was mixed with 2.2 grams of hydrolysed plant protein (FIDCO's BN-10) and hydrated with 180 ml of boiling water. 0.01 grams of water phase was mixed with the same amount of HPP and boiling water. 0.01 grams of water trap were mixed in the same fashion. The yield from each fraction and the organoleptic evaluation of respective fractions with BN-10 as described above are summarised below:

| Fraction | Time (min) | Yield (g) | Descrip. of Organoleptic Evaluation |
|---|---|---|---|
| 2 | 2–4 | 9.1 | Braised beef |
| 3 | 4–9 | 23.4 | Charcoal broiled steak |
| 4 | 9–17 | 15.8 | Roasted beef |
| 5 | 17–27 | 11.9 | Roasted beef (well done) |
| water phase | | 6.1 | Bloody beef |
| TOTAL YIELD | | 72.7 (72.7%) | |
| water trap | | | Grilled beef |

Further, these fractions were combined in various ratios to provide specific beef flavour characters to a variety of applications such as a beef "au jus" dehydrated mix.

Adding 15% of the last fraction to either fraction 2 or fraction 3 created a sliced roast beef flavour to the HPP base.

EXAMPLE 6

By following a similar procedure to that described in Example 5 but using a commercial food grade oleic acid containing 75% oleic acid and 6% linoleic acid, a comparable series of flavours was produced.

EXAMPLE 7

By following a similar procedure to that described in Example 5 but using a commercial food grade tallow fatty acid containing 42% oleic acid and 5% linoleic acid, a comparable series of products was produced.

EXAMPLE 8

150 g of oleic acid was heated to 325° C. for 3 hours in the presence of air as described in example 5, but the air flow rate was 670 ml/min. The applications of these fractions of HPP were carried out and evaluated in the same fashion as in Example 1. The results are summarised as follows:

| Fraction | Time (min) | Yield (g) | Descrip. of Organoleptic Evaluation |
|---|---|---|---|
| 1 | 0–25 | 4.8 | Green and fatty |
| 2 | 25–85 | 9.6 | Buttery |
| 3 | 85–130 | 18.5 | Charcoal broiled steak with roasted |
| 4 | 130–180 | 18.3 | Roasted beef |
| water phase | | 19.7 | Bloody beef |
| TOTAL YIELD | | 70.9 (47.3%) | |
| water trap | | | Grilled beef |

EXAMPLE 9

Linoleic acid (100 g) was heated to 325° C. in the presence of air as described in Example 5 with the same air flow rate of 1830 ml/min. 0.02 grams of each fractionated flavourant was mixed with 2.2 grams of HPP base chicken flavour (FIDCO's Spectra SBT and CBH chicken flavour) hydrated and evaluated as described in Example 1. The results are summarised as follows:

| Fraction | Time (min) | Yield (g) | Descrip. of Organoleptic Evaluation |
|---|---|---|---|
| 1 | 0–5 | 5.2 | With the exception of fraction 1, all fractions improved the meaty chicken flavour, especially fraction 3 and 4. Fraction 5 also imparted a roasted chicken note. |
| 2 | 5–9 | 9.1 | |
| 3 | 9–20 | 17.4 | |
| 4 | 20–32 | 8.0 | |
| 5 | 32–45 | 4.7 | |
| water phase | | 4.4 | Bloody & meaty |
| TOTAL YIELD | | 48.8 (48.8%) | |
| water trap | | | Grilled and meaty |

Similar results were obtained when chicken fatty acids, commercial linoleic acids obtained from soy, and black currant fatty acids were heated, processed and evaluated the same way. The total yield range was 40–55%.

EXAMPLE 10

100 g of pork fat fatty acids were heated to 325° C. in the presence of air as described in Example 5 with the same air flow rate of 1830 ml/min. 0.02 grams of each fractionated flavourant was mixed with 2.2 grams of pork flavour (FIS'5SF 331 pork flavour) and hydrated with 180 ml boiling water, whereupon the pork character of the flavourant was greatly enhanced.

EXAMPLE 11

By following a similar procedure to that described in Example 10, but using 100 g of a mixture containing 4.5 parts oleic acid and 1 part linoleic acid, the pork character of the flavourant was greatly enhanced.

EXAMPLE 12

A process similar to that of Example 9 was followed except that black currant seed fatty acids and linseed oil fatty acids were used as precursors.

When the product fractions from pyrolysis of black currant fatty acids and linseed fatty acids were applied on a bland base of soup, it imparted a baked fish flavour to the soup. Fraction 2 gave the best baked fish flavour.

EXAMPLE 13

A process similar to that of Example 5 was followed except that 1800 ml of air was bubbled through the material and the reaction carried out for 15 minutes at 325° C. All of the material that was distilled from the bomb was used as the flavourant. Following separation of the water layer the oil soluble material had a strong roast beef character when evaluated at 0.002 grams in 2.2 grams Spectra BN-10.

We claim:

1. A process for the preparation of flavorants comprising passing oxygen to and through at least one fatty acid while heating the at least one fatty acid at a temperature of from 150° C. to 475° C. and collecting differing volatile fractions evolved over differing periods of time from the at least one heated fatty acid while heating the at least one fatty acid for obtaining flavorants.

2. A process according to claim 1 wherein the at least one fatty acid is heated at a temperature of from 250° C. to 400° C.

3. A process according to claim 1 further comprising collecting water evolved from the at least one heated fatty acid for obtaining a further flavorant.

4. A process according to claim 1 wherein at least two differing volatile fractions are collected and further comprising mixing at least two of the collected flavorants for obtaining a different flavorant.

5. A process according to claim 1 further comprising collecting the at least one heated fatty acid after collecting the volatile fractions for obtaining a further flavorant.

6. A process according to claim 1 wherein the oxygen is provided by air.

7. A process according to claim 6 wherein the air is passed through the at least one fatty acid at a rate of from 1 ml/min to 5000 ml min per 100 g of the at least one fatty acid.

8. A process according to claim 1 wherein the at least one fatty acid is heated in a bomb-type apparatus.

9. A process according to claim 8 wherein the oxygen is provided by air and further comprising passing the air passed through the at least one fatty acid to a cold trap and to a cold water trap for collecting differing volatile fractions over differing periods of time and for collecting water evolved from the at least one heated fatty acid for obtaining a further flavorant.

10. A process according to claim 1 further comprising adding a flavor precursor to the at least one fatty acid to be heated.

11. A process according to claim 1 wherein the at least one fatty acid to be heated is selected from the group of fatty acids consisting of fatty acids which contain from 6 to 30 carbon atoms.

12. A process according to claim 1 wherein the at least one fatty acid to be heated is selected from the group of fatty acids consisting of lauric acid, palmitic acid, stearic acid, oleic acid and linoleic acid.

13. A process according to claim 1 wherein the at least one fatty acid to be heated is selected from the group of fatty acids consisting of butter acids, dairy acids, cheese acids, enzyme hydrolyzed vegetable oils and enzyme hydrolyzed animal fats.

14. A process according to claim 1 further comprising mixing at least one collected fraction with a carrier for incorporation into a foodstuff.

15. A process according to claim 1 further comprising mixing at least one collected fraction with a carrier suitable for spray drying and then spray drying the fraction and carrier mixture.

16. A process according to claim 1 further comprising dispersing at least one collected fraction in a fat.

* * * * *